United States Patent
Kim (10) Patent No.: US 8,970,875 B2
(45) Date of Patent: Mar. 3, 2015

(54) IMAGE FORMING APPARATUS AND METHOD FOR PRODUCING E-BOOK CONTENTS

(75) Inventor: Dae-hyun Kim, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 434 days.

(21) Appl. No.: 13/011,443

(22) Filed: Jan. 21, 2011

(65) Prior Publication Data

US 2011/0304860 A1    Dec. 15, 2011

(30) Foreign Application Priority Data

Jun. 14, 2010  (KR) .................. 10-2010-0056007

(51) Int. Cl.
*G06F 3/12* (2006.01)
*H04N 1/00* (2006.01)

(52) U.S. Cl.
CPC ............ *G06F 3/1284* (2013.01); *G06F 3/1206* (2013.01); *G06F 3/1247* (2013.01); *H04N 1/00456* (2013.01); *G06F 2206/1512* (2013.01)
USPC .......................... 358/1.15; 358/1.13; 358/1.14

(58) Field of Classification Search
CPC .................................................... G06F 3/1292
USPC ................. 399/158; 358/1.18, 1.9, 1.13–1.15
See application file for complete search history.

(56) References Cited

U.S. PATENT DOCUMENTS

| | | | |
|---|---|---|---|
| 4,837,635 A * | 6/1989 | Santos ........................ | 358/401 |
| 6,157,439 A * | 12/2000 | Rousseau et al. ............... | 355/61 |
| 7,480,411 B1 * | 1/2009 | Tzadok et al. ................ | 382/182 |
| 8,068,247 B2 * | 11/2011 | Wu ............... | 358/1.15 |
| 8,254,681 B1 * | 8/2012 | Poncin et al. ................. | 382/180 |
| 8,797,576 B2 * | 8/2014 | Otsuka ........................ | 358/1.15 |
| 2005/0190394 A1 * | 9/2005 | Ohue .......................... | 358/1.13 |
| 2007/0276865 A1 * | 11/2007 | Bodin et al. ............... | 707/104.1 |
| 2008/0046829 A1 * | 2/2008 | Leong ........................... | 715/764 |
| 2008/0294674 A1 * | 11/2008 | Reztlaff et al. ............... | 707/102 |
| 2010/0315326 A1 * | 12/2010 | Le Chevalier et al. ........ | 345/107 |
| 2011/0029435 A1 * | 2/2011 | Ronen et al. .................... | 705/53 |
| 2011/0181894 A1 * | 7/2011 | Martin .......................... | 358/1.2 |
| 2011/0264756 A1 * | 10/2011 | Moriwaki .................... | 709/206 |

FOREIGN PATENT DOCUMENTS

| | | |
|---|---|---|
| JP | 2006-041759 | 2/2006 |
| JP | 2008-252635 | 10/2008 |
| JP | 2009-245028 | 10/2009 |

\* cited by examiner

Primary Examiner — Dennis Dicker
(74) Attorney, Agent, or Firm — Staas & Halsey LLP (57) ABSTRACT

An image forming apparatus is provided. The image forming apparatus includes a function unit which performs a function of the image forming apparatus, a user interface which receives a selection of job data processed by the function unit and a selection of a layout for the job data, a contents production unit which produces electronic book (e-book) contents for the selected job data based on the selected layout, and a communication interface which transmits the produced e-book contents to an external device.

26 Claims, 12 Drawing Sheets

| | | | |
|---|---|---|---|
| Ec(0U | ASCII | Symbol Set | |
| Ec(s0P | Fixed | Spacing | |
| Ec(s16.66H | 16.66 cpi | Pitch | |
| Ec(s8.5V | 8.5 point | Height | Control Code & Data |
| : | : | : | |
| Ec(s0T | Line Printer | Typeface Family | |
| ABCDEFGHIJKLMNOPQRSTUVWXYZ | | Text Data | |

IMAGE FORMING APPARATUS AND METHOD FOR PRODUCING E-BOOK CONTENTS

CROSS-REFERENCE TO RELATED APPLICATIONS

This application claims the priority benefit from Korean Patent Application No. 10-2010-0056007, filed on Jun. 14, 2010, in the Korean Intellectual Property Office, the disclosure of which is incorporated herein by reference in its entirety.

BACKGROUND

1. Field

The embodiments relate to an image forming apparatus and a method for producing e-book contents, and more particularly, to an image forming apparatus which can produce e-book contents using various job data of the image forming apparatus, and a method for producing e-book contents.

2. Description of the Related Art

An image forming apparatus refers to an apparatus that prints printing data generated at a terminal apparatus, such as a computer, on recording paper. Examples of such an image forming apparatus are copiers, printers, facsimile machines, and multifunction peripherals complexly realizing the functions of the aforementioned devices through a single device.

In recent years, as personal mobile devices have been developed and users are able to obtain diverse information easily, electronic books (e-book) have proliferated as a personal apparatus and contents markets for a corresponding apparatus have also proliferated.

Although the e-book contents markets have proliferated as the e-book markets have proliferated, a manufacturer of contents used in an e-book is limited to a main publishing company. However, there is a limit to the e-book contents provided by the publishing company and a user should pay much money for the e-book contents in some situations.

Therefore, there is a need for a method for producing an e-book using contents owned by a user.

SUMMARY

Accordingly, it is an aspect of the embodiments to provide an image forming apparatus which can produce e-book contents using diverse job data of the image forming apparatus and a method for producing e-book contents.

The foregoing and/or other aspects are achieved by providing an image forming apparatus, including: a function unit which performs a function of the image forming apparatus, a user interface which receives a selection of job data processed by the function unit and a selection of a layout for the job data, a contents production unit which produces electronic book (e-book) contents for the selected job data based on the selected layout, and a communication interface which transmits the produced e-book contents to an external drive.

The image forming apparatus may further include a contents processing unit which extracts a plurality of objects from the selected job data, and the content production unit may produce e-book contents by arranging the extracted objects on the selected layout.

If the extracted object is an image, the contents processing unit may perform at least one process of size conversion, optical character recognition (OCR), and color processing of the extracted image or combinations thereof.

The contents processing unit may extract text by extracting a text data part of the selected job data as text or by performing OCR with respect to an extracted image object.

The contents production unit may produce e-book contents using a template corresponding to the selected layout.

The contents production unit may produce e-book contents in a format that is supported by an e-book terminal to which the produced e-book contents are to be transmitted.

The user interface may display the produced e-book contents.

The user interface may receive a correcting command with respect to the displayed e-book contents, and the contents production unit may correct the produced e-book contents based on the received correcting command.

The function unit may perform at least one function of copying, printing, scanning, fax transmitting, and fax receiving or combination thereof.

The image forming apparatus may further include a storage unit which stores the produced e-book contents.

The job data may include data that is stored in the storage unit as a result of performing a function by the function unit.

The foregoing and/or other aspects are also achieved by providing a method for producing e-book contents of an image forming apparatus, including: receiving a selection of job data which has been processed by the image forming apparatus during a function performing process, receiving a selection of a layout for the job data, producing e-book contents for the selected job data based on the selected layout; and transmitting the produced e-book contents to an external device.

The method may further include extracting a plurality of objects from the selected job data, and the producing the e-book contents may include producing the e-book contents by arranging the extracted objects on the selected layout.

If the extracted objects are an image, the extracting the objects may include performing at least one process of size conversion, OCR, and color processing of an extracted image.

The extracting the objects may include extracting text by extracting a text data part of the selected job data as text or by performing OCR with respect to an extracted image object.

The producing the e-book contents may include producing the e-book contents using a template corresponding to the selected layout.

The producing the e-book contents may include producing the e-book contents in a format that is supported by an e-book terminal to which the produced e-book contents are to be transmitted.

The method may further include displaying the produced e-book contents.

The method may further include: receiving a correcting command with respect to the displayed e-book contents; and correcting the produced e-book contents based on the received correcting command.

The job data may include data that is used in an operation of performing at least one function of copying, printing, scanning, fax transmitting, fax receiving, or combinations thereof.

The method may further include storing the produced e-book contents.

BRIEF DESCRIPTION OF THE DRAWINGS

The above and/or other aspects will become more apparent by describing in detail the exemplary embodiments, with reference to the accompanying drawings in which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
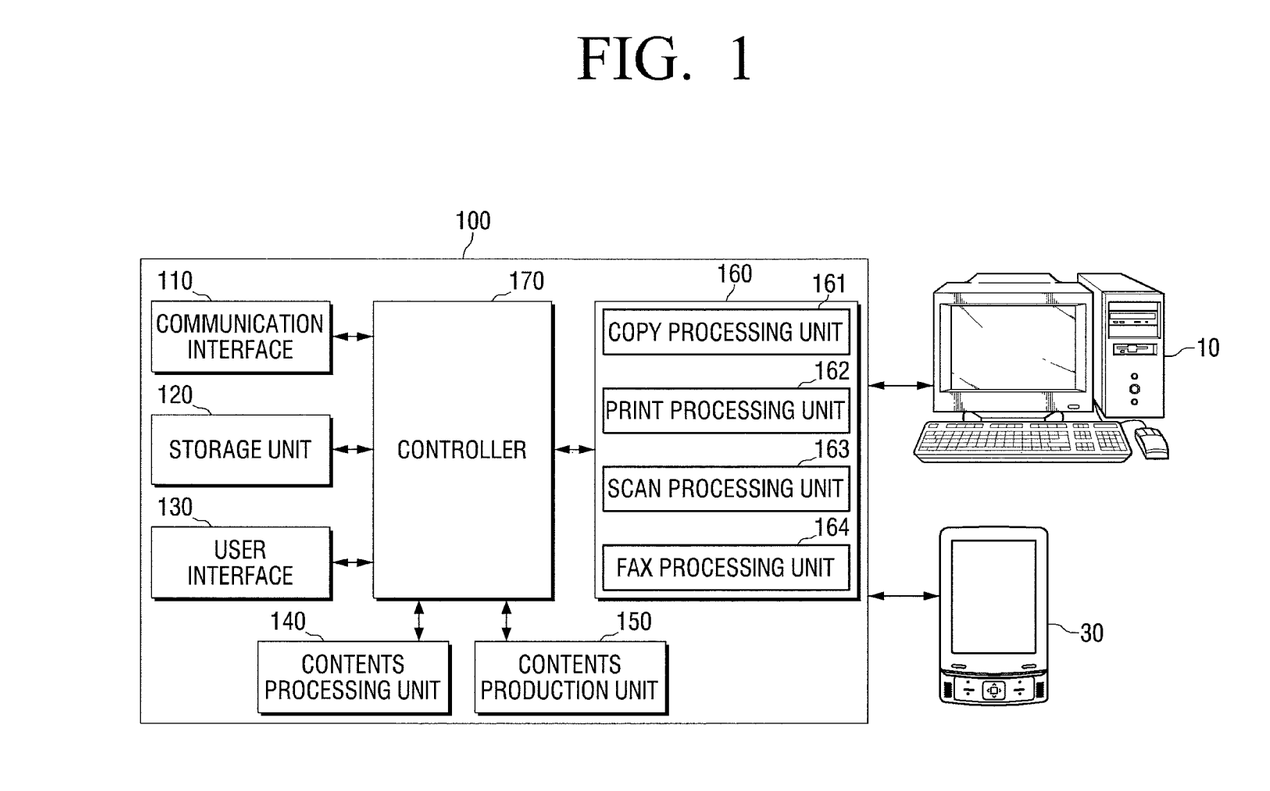
FIG. 1 is a block diagram illustrating an image forming apparatus according to an exemplary embodiment.

FIG. 1 is a block diagram illustrating an image forming apparatus according to an exemplary embodiment.

Referring to FIG. 1, an image forming apparatus 100 includes a communication interface 110, a storage unit 120, a user interface 130, a contents processing unit 140, a contents production unit 150, a function unit 160, and a controller 170.

The communication interface 110 is adapted to connect the image forming apparatus 100 to a printing control terminal apparatus 10 or an e-book terminal apparatus 30, via not only a local area network (LAN) or Internet but also a universal serial bus (USB) port. The communication interface 110 may receive print job data from the printing control terminal apparatus 10 and also may receive fax job data from an external fax server (not shown).

Also, the communication interface 110 may transmit job data generated by the function unit 160, which will be described later, such as scan job data and fax transmit job data to the printing control terminal apparatus 100 or the fax server (not shown).

The communication interface 110 may transmit produced e-book contents to an external apparatus, such as the print apparatus 10 or the e-book apparatus 30. More specifically, the communication interface 110 may transmit the e-book contents produced by the contents production unit 150, which will be explained later, to the printing control terminal apparatus 10 and/or the e-book terminal apparatus 30. In this case, the communication interface 110 may automatically transmit e-book contents produced and/or stored in the storage unit 120 to the e-book terminal apparatus 30 when the e-book terminal apparatus 30 is connected to the communication interface 110.

The communication interface 110 may receive information of the e-book terminal apparatus 30 from the e-book terminal apparatus 30. The information of the e-book terminal apparatus 30 may include a format of e-book contents and a storing capacity supported by the e-book terminal apparatus 30. The information of the e-book terminal apparatus 30 is transmitted to the contents production unit 150 and is used in determining a format of e-book contents to be produced.

The e-book contents refer to contents that can be used in the e-book terminal apparatus 30, and may have a format dedicated to the e-book, such as a Portable Document Format (PDF), an electronic publication (EPUB) formAt, and a DjVu format, as well as a format such as a TXT format, a PPT format, a DOC format, an XPS format.

The storage unit 120 stores job data. More specifically, the storage unit 120 may store job data that is to be used in the function unit 160 (input data and/or output data of the function unit 160). For example, the storage unit 120 may store print data (Printer Control Language (PCL), PostScript (PS), Page Description Language (PDL), etc.), scan data, copy data, fax transmit data, and/or fax receive data.

If the image forming apparatus 100 supports a direct printing function, the storage unit 120 may store a file such as a JPG file or a DOC file and may use the file as print data. The direct printing function refers to a function that performs a printing job directly without executing an extra application at a terminal apparatus, such as a personal computer, a laptop computer, a personal digital assistant (PDA), or a digital camera, simply by transmitting a file to an image forming apparatus.

The storage unit 120 may store the produced e-book contents. More specifically, the storage unit 120 may store the e-book contents produced by the contents production unit 150. Also, the storage unit 120 may store the information of the e-book terminal apparatus 30 received from the e-book terminal apparatus 30. The storage unit 120 may be an internal storage medium or an external storage medium of the image forming apparatus 100, for example, a removable disk including a USB memory or a web server connected over a network. However, it is not limited thereto.

The user interface 130 has a plurality of function keys through which a user can set or select diverse functions supported by the image forming apparatus 100, and displays diverse information provided by the image forming apparatus 100. The user interface 120 may perform input and output operations simultaneously, such as via a touch pad or a device combining a mouse and a monitor.

The user interface 130 may display a user interface window to receive a selection of job data. More specifically, the user interface 130 may display job data which has been processed and stored in the storage unit 120 or display the user interface window to receive a selection of a function supported by the image forming apparatus 100. Accordingly, the user is able to select job data for producing e-book contents. For example, the user selects a single job data or several job data from the already-processed job data, thereby producing e-book contents based on the selected job data.

Also, by selecting a function of the image forming apparatus 100, the user can select job data generated by or used for the selected function as job data for producing e-book contents. For example, if the user selects a fax transmit function, data scanned for fax transmission may be used as job data for producing e-book contents. In this exemplary embodiment, the image forming apparatus 100 produces the e-book contents while performing the functions of the image forming apparatus 100. However, the function may be selected for the purpose of producing the e-book contents. For example, if the user selects a scan function, a scanned document is used for the purpose of generating e-book contents.

The user interface 130 may receive a selection of a layout to be applied to the job data. More specifically, the user interface 130 may display a plurality of layouts (or templates) to be applied to the selected job data, and may receive a selection of one of the displayed layouts (or templates). The user may limit the type of object to be included in the e-book contents, and may select an object or an area to be used in the selected job data. For example, the user may set text of the job data to be used in producing e-book contents or may set an image included in the job data to be converted into a monochrome image. Also, the user may select a format of e-book contents to be produced.

The template recited herein refers to an image that is generated by the user or generated in the image forming apparatus 100 to be combined with image data given to the image forming apparatus 100. Diverse templates are provided according to types of contents.

The user interface 130 may display the produced e-book contents. More specifically, the user interface 130 may display the e-book contents produced by the contents production unit 150 in the form of a preview image. Through this, the user can check the preview image of the e-book contents to be displayed on the e-book terminal apparatus 30 in advance. If there is a portion needing to be corrected, the characteristic of the object applied to the produced e-book contents is changed or the layout, such as arrangement and size of each object, is corrected.

The contents processing unit 140 extracts a plurality of objects from the selected job data. More specifically, the contents processing unit 140 extracts an object that is distinguished from the job data selected through the user interface 130. A detailed extracting operation will be explained later with reference to FIG. 4.

If the object extracted by the contents processing unit 140 is an image, image-processing, such as size conversion, optical character recognition (OCR), and color-processing, may be performed for the extracted image. Such image processing may be performed based on a user's selection which is input through the user interface 130 or may be performed by a pre-set processing algorithm.

Also, the contents processing unit 140 may extract text by extracting a text data part of the selected job data or by performing the OCR with respect to the extracted image object. A detailed operation of extracting text will be explained later with reference to FIGS. 5 and 6.

The contents production unit 150 produces e-book contents for the selected job data based on the selected layout. More specifically, the contents production unit 150 arranges the object extracted by the contents processing unit 140 on the layout selected through the user interface 130, thereby producing e-book contents. The operation of arranging the layout will be explained later with reference to FIG. 7.

The contents production unit 150 may produce the e-book contents in a format supported by the e-book terminal apparatus 30 to which the produced e-book contents are to be transmitted. More specifically, the contents production unit 150 may produce the e-book content in a format usable in a corresponding e-book terminal apparatus using the information of the e-book terminal apparatus pre-stored in the storage unit 120.

The function unit 160 performs the functions of the image forming apparatus 100, such as copying, printing, scanning, fax transmitting, and fax receiving. More specifically, the function unit 160 may include a copying processor 161, a printing processor 162, a scanning processor 163, and a faxing processor 164 or combinations thereof.

The copying processor 161 performs a copying function and controls an operation of outputting data scanned by a scanning unit through a printing engine. The scanned data may be stored in the storage 120 as copy data.

The printing processor 162 performs a printing function and controls an operation of outputting print data received through the communication interface 110 through the printing engine. More specifically, the printing processor 162 may store Page Description Language (PDL) such as PCL and PS received through the communication interface 110 in the storage unit 120 as print data, and may store data rendered in a binary format in the storage unit 120 as print data.

The scanning processor 163 performs a scanning function and controls an operation of processing data scanned by the scanning unit in the image forming apparatus 100. The scanned data may be stored in the storage 120 in a RAW data format which does not yet undergo image processing, or may be stored in the storage unit 120 in the formats of JPG, TIFF, PDF, and/or XPS which have already undergone image processing. Also, the scanned data may be stored as ASCII and/or Unicode data, such as text which is text-recognized through the OCR.

The faxing processor 164 performs a fax transmitting function and a fax receiving function, and controls an operation of outputting fax data received from a faxing unit through the printing engine or an operation of transmitting data scanned by the scanning unit to the faxing unit.

The controller 170 controls the components of the image forming apparatus 100. More specifically, if a selection of job data or a function of the image forming apparatus 100 is received from the user, the controller 170 controls the function unit 160 to perform the function of the image forming apparatus 100, and controls the contents processing unit 140 and the contents production unit 150 to produce e-book contents for the job data used for performing the corresponding function.

If the e-book contents are produced through the above-described process, the controller 170 may store the produced e-book contents in the storage unit 120 or transmit the produced e-book contents to the printing control terminal apparatus 10 and/or the e-book terminal apparatus 30.

As the image forming apparatus 100 according to an exemplary embodiment produces the e-book contents using the job data used therein, the user can produce the e-book contents easily. Also, since the user can select or change the layout of the e-book contents to be produced through the user interface window, user's convenience is enhanced.

FIGS. 2A-2D are views illustrating transmit flows of job data according to an exemplary embodiment.

Figure 2A:
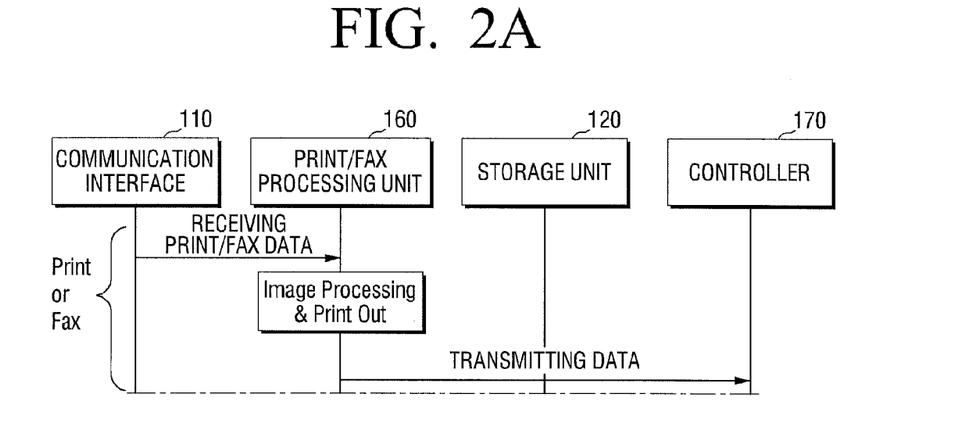
FIGS. 2A-2D are views illustrating transmit flows of job data according to an exemplary embodiment.

More specifically, if the user selects a printing or fax transmitting function, print data or fax transmission data is received through the communication interface 110 as shown in FIG. 2A. The received print data or fax transmission data is processed through the function unit 160, and corresponding job data is transmitted to the controller 170 so that the controller 170 performs an operation of producing e-book contents.

Figure 2B:
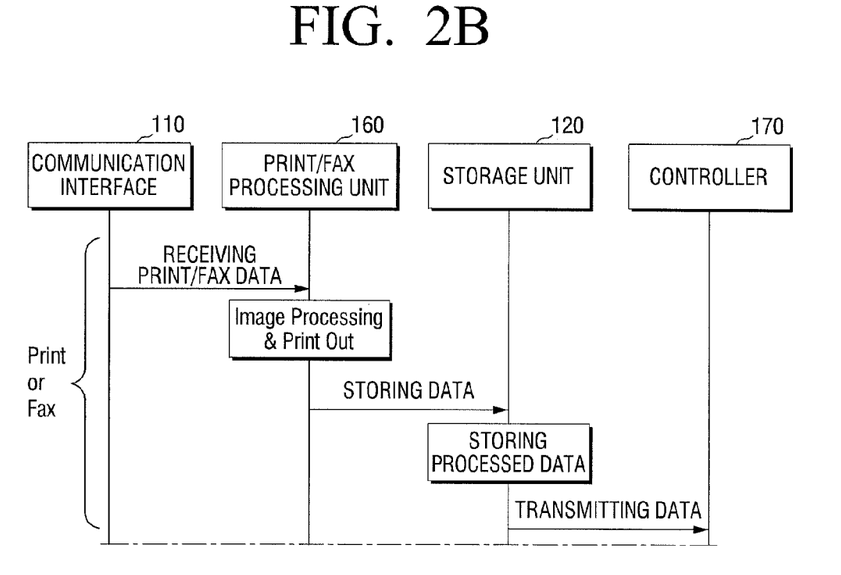
Figure 2C:
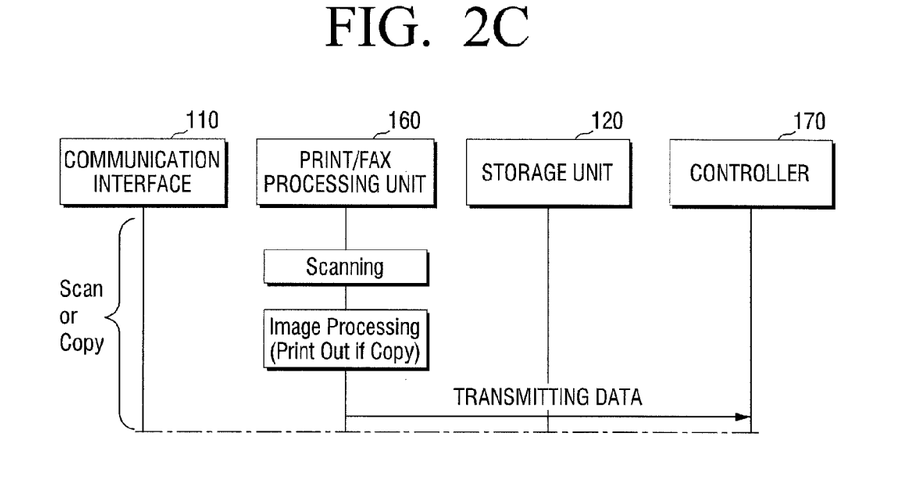

If the user selects a scanning function or a copying function, data scanned through the scanning unit is transmitted to the controller 170 so that the controller 170 performs an operation of producing e-book contents as shown in FIG. 2C.

Figure 2D:
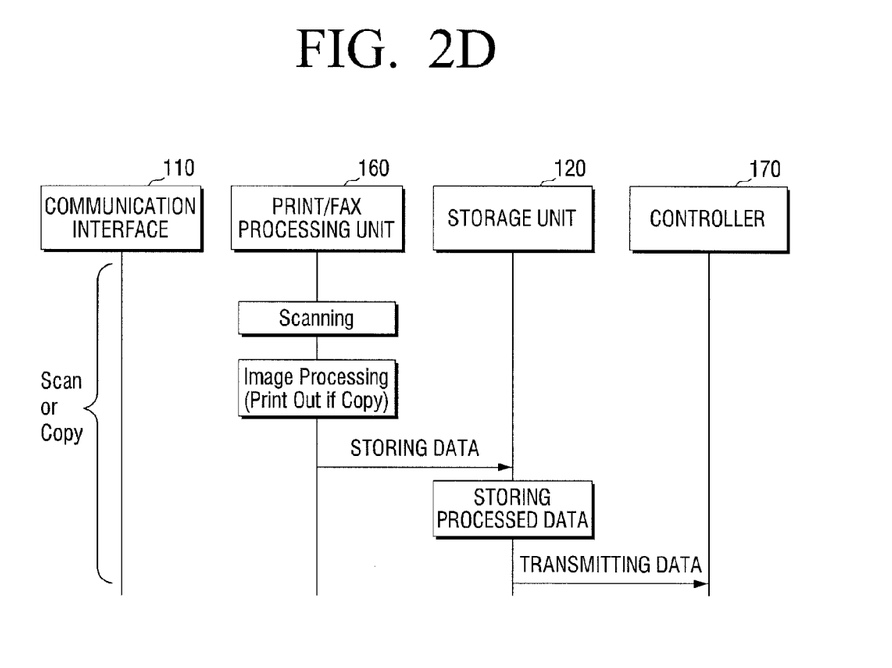

If the user selects job data which has been already processed and stored in the image forming apparatus 100, the storage unit 120 transmits the stored job data to the controller 170 so that the controller 170 performs an operation of producing e-book contents, as shown in FIG. 2B or FIG. 2D.

Figure 3:
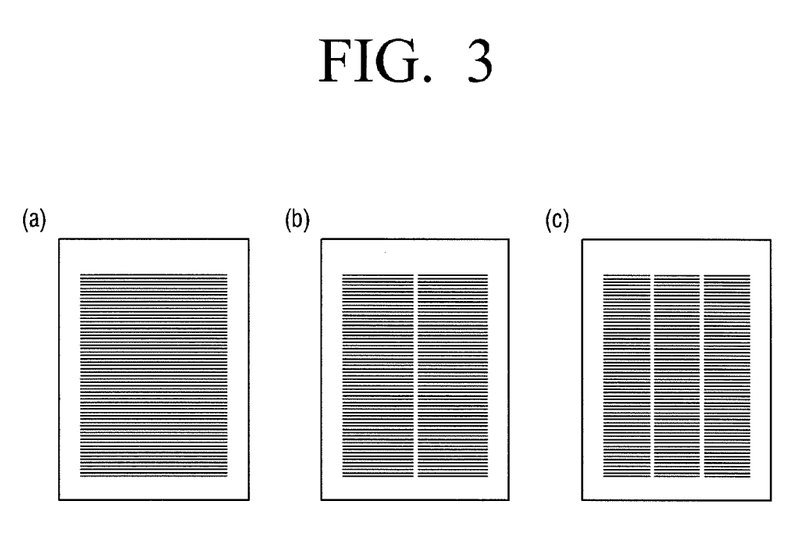
FIG. 3 is a view illustrating examples of a layout according to an exemplary embodiment.

FIG. 3 is a view illustrating diverse examples of the layout.

Referring to FIG. 3, the layout has diverse formats and the user can determine the layout of e-book contents to be produced by selecting one of the layouts illustrated in FIG. 3. Also, the three layouts are illustrated but should not be considered as limiting.

Figure 4:
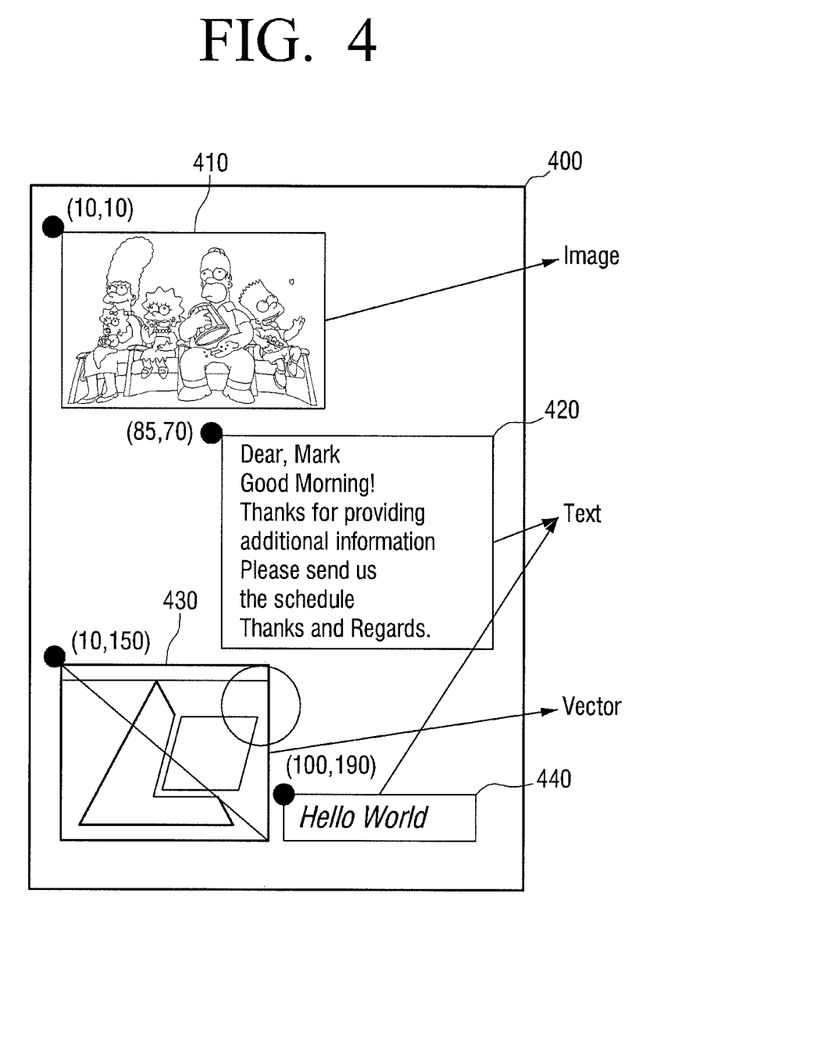
FIGS. 4 to 6 are views illustrating examples of job data used in the image forming apparatus.
Figure 5:
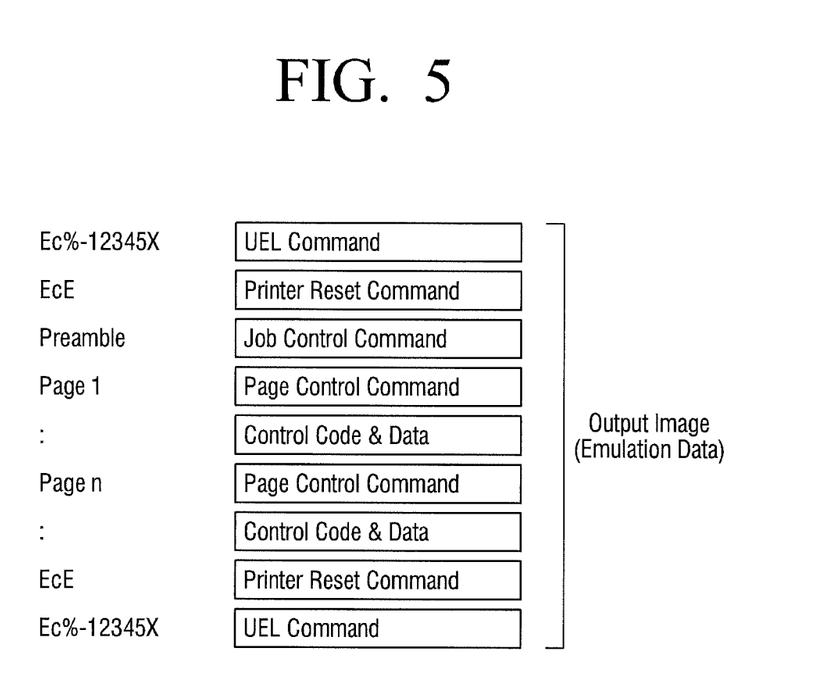
Figure 6:
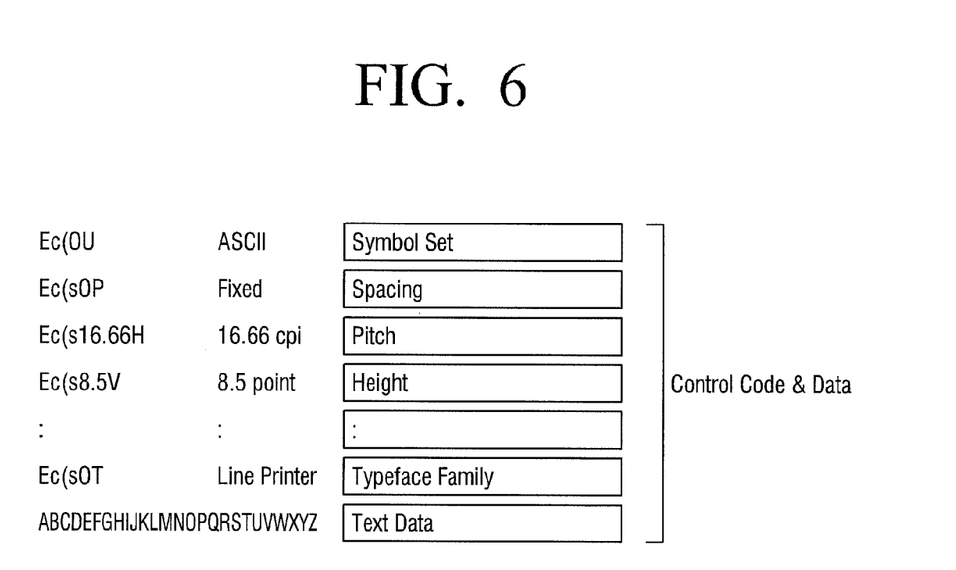

FIGS. 4 to 6 are views illustrating examples of job data used in the image forming apparatus 100.

FIG. 4 illustrates a configuration of PDL data among the job data. More specifically, the PDL data includes text, image and vector in view of a data property, and the layout of each object is determined as shown in FIG. 4. Accordingly, in order to produce e-book contents using the PDL data, elements which are constitutive of each layout of the PDL data are converted into elements which are constitutive of the e-book.

FIGS. 5 and 6 illustrate a configuration of PCL data among the job data. The PCL data includes a plurality of text data parts as shown in FIGS. 5 and 6. Accordingly, the contents processing unit 140 extracts a text part from the plurality of text data parts.

Figure 7:
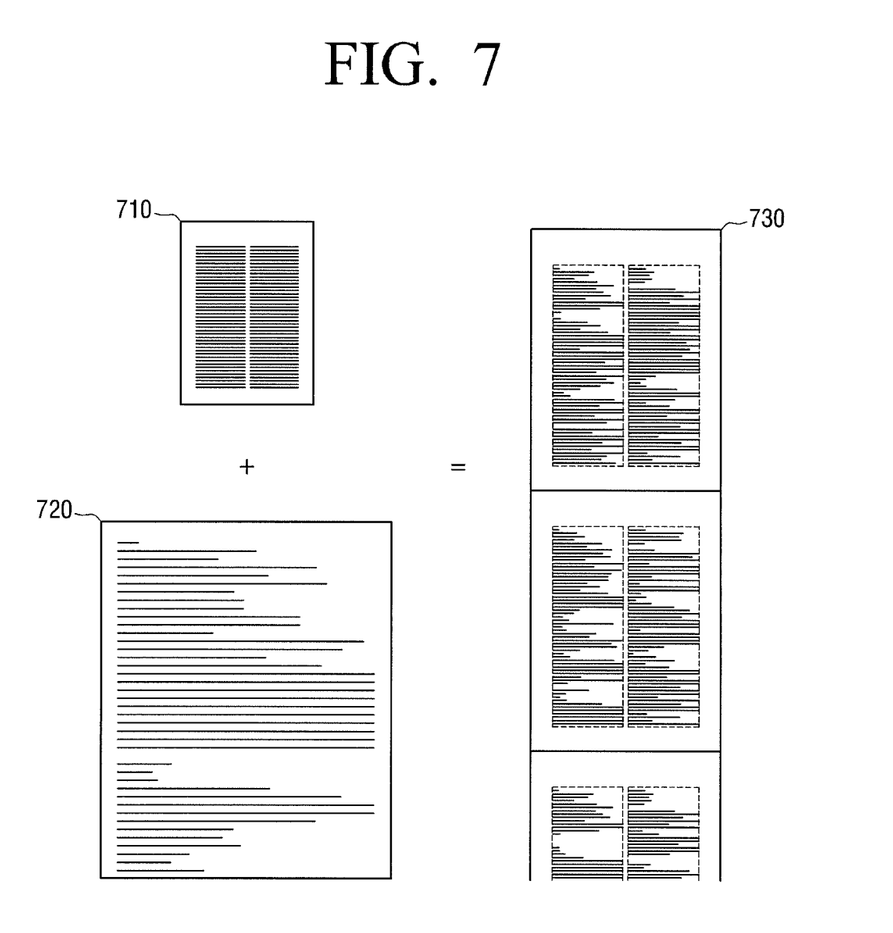
FIG. 7 is a view to explain an operation of a contents production unit of FIG. 1.

FIG. 7 is a view to explain the operation of the contents production unit 150 of FIG. 1.

Referring to FIG. 1, if job data 720 and a layout 710 to be applied to the job data 720 are selected, the contents production unit 150 performs contents merging with respect to the job data 720 selected by the user based on the layout 710 selected by the user, thereby producing e-book contents 730.

Figure 8:
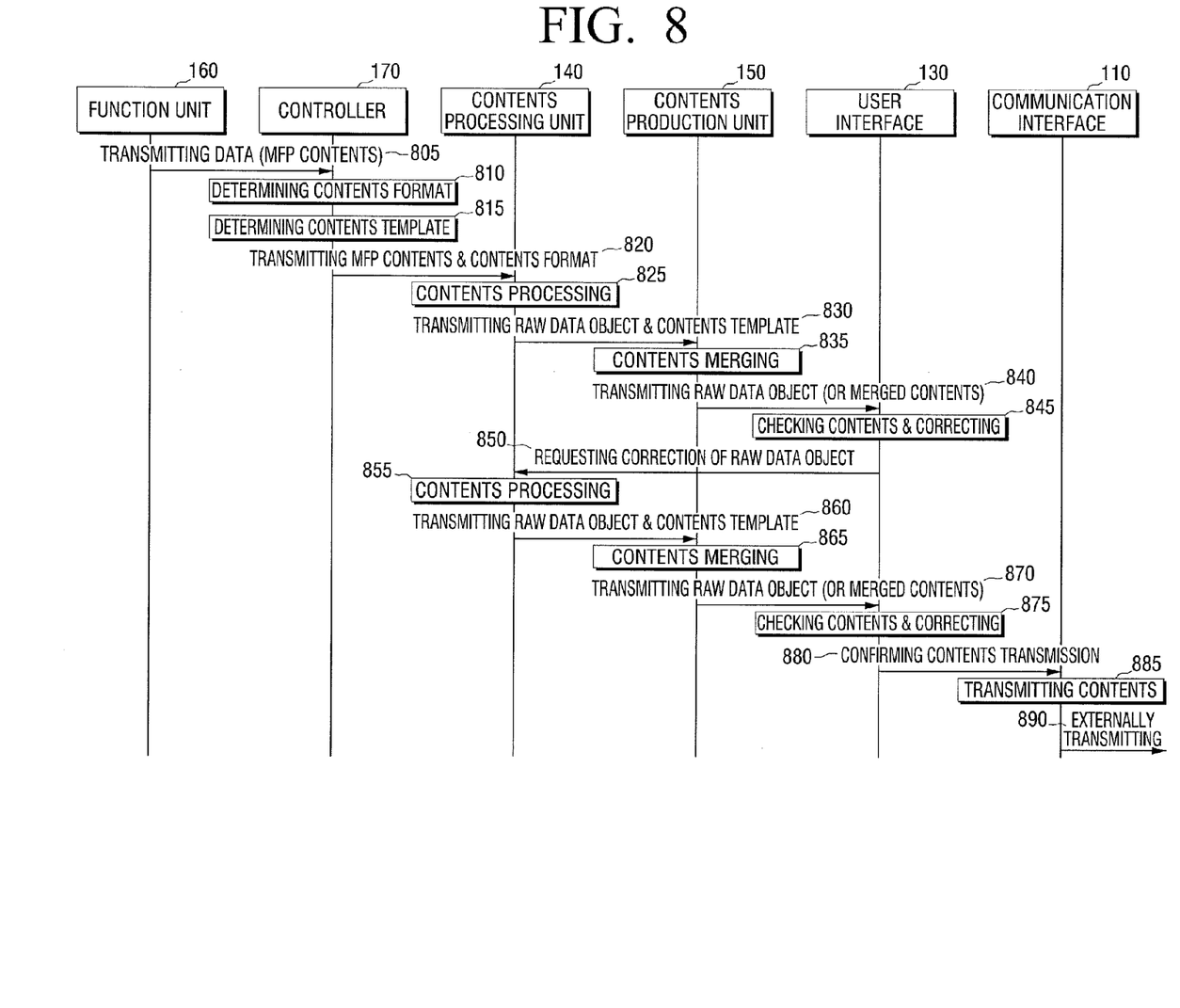
FIG. 8 is a sequence chart illustrating a method for producing e-book contents according to an exemplary embodiment.

FIG. 8 is a sequence chart illustrating a method for producing e-book contents according to an exemplary embodiment.

Referring to FIG. 8, if job data processed by the function unit 160 is transmitted to the controller 170 (805), a format for e-book contents to be produced is selected (810). More specifically, if the e-book terminal apparatus 30 is connected to the image forming apparatus 100, a format of e-book contents that is readable by the e-book terminal apparatus 30 is selected. In practice, the format may be selected by the user or pre-selected and set by the user.

A layout for the selected job data is selected (815). More specifically, a template to be applied to the selected job data selected by the user. The layout may be pre-selected and set.

Information of the selected format and the layout is transmitted to the contents processing unit 140 and the contents production unit 150 (820, 830). Based on the transmitted information, an object for the selected job data is extracted (825), and the extracted object is arranged on the selected layout, so that the e-book contents can be produced (840).

The produced e-book contents are displayed through the user interface window (845), and, if there is a part the user wishes to correct, a series of operations corresponding to user's correction is repeated (850~875).

If the e-book contents are finally produced (880), the communication unit 110 may transmit the produced e-book contents to an external device, such as the e-book terminal apparatus 30 and/or the printing control terminal apparatus 10 (885, 890).

Figure 9:
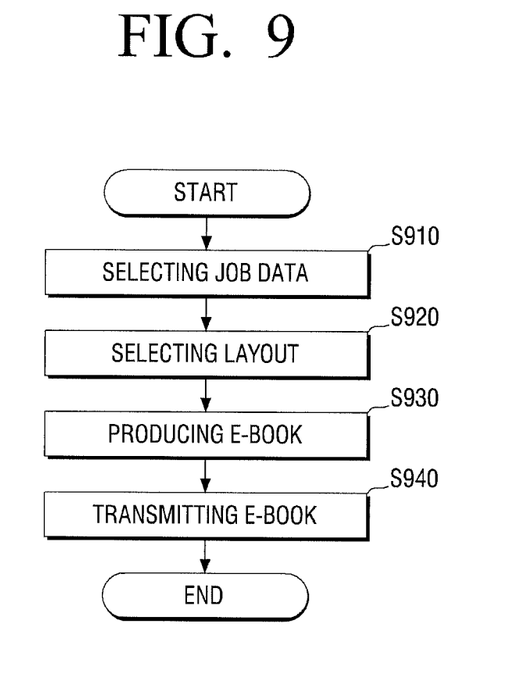
FIG. 9 is a flowchart illustrating a method for producing e-book contents according to an exemplary embodiment.

FIG. 9 is a flowchart illustrating a method for producing e-book contents according to an exemplary embodiment.

Job data processed in performing a function of the image forming apparatus 10 is selected (S910). More specifically, job data which has been already processed and stored may be displayed, and job data for production of e-book contents may be selected through the user interface window, through which a function supported by the image forming apparatus 100 is selected.

Also, a layout for the job data is selected (S920). More specifically, a layout to be applied to the selected job data is selected from among a plurality of layouts.

E-book contents for the selected job data is produced based on the selected layout (S930). More specifically, a plurality of objects are extracted from the selected job data and the extracted objects are arranged on the layout selected through the user interface 130, so that the e-book contents are produced. The operation of producing the e-book contents has been described in the above and thus a detailed explanation is omitted.

Finally, the produced e-book contents are transmitted to the external device (S940). More specifically, the produced e-book contents may be transmitted to the e-book terminal apparatus 30 and/or the printing control terminal apparatus 10. Prior to being transmitted, the e-book contents are displayed and, if there is a part needed to be corrected in the e-book contents, correcting is performed. The finally produced e-book contents are stored in the storage unit 120 of the image forming apparatus 100.

As described above, since the e-book contents can be produced using the job data used in the image forming apparatus 100, the user can produce the e-book contents easily. Also, since a layout for e-book contents to be produced is selected by the user, user's convenience is enhanced. The method for producing the e-book contents of FIG. 9 is executed in the image forming apparatus 100 having the configuration of FIG. 1 and can also be executed in an image forming apparatus having other configuration.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. An image forming apparatus, comprising:
a function unit which performs a function of the image forming apparatus;
a user interface which receives a selection of job data processed by the function unit and a selection of a layout for the job data;
a storage storing information regarding a plurality of different formats supported by a plurality of electronic book (e-book) terminals;
a contents production unit which produces e-book contents for the selected job data based on the selected layout and in one of the plurality of different formats that is determined to be supported by an e-book terminal to which the produced e-book contents are to be transmitted; and
a communication interface which transmits the produced e-book contents to the e-book terminal,
wherein the one of the plurality of formats is selected automatically when the e-book terminal is connected to the image forming apparatus.

2. The image forming apparatus as claimed in claim 1, further comprising a contents processing unit which extracts a plurality of objects from the selected job data,
wherein the contents production unit produces e-book contents by arranging the extracted objects on the selected layout.

3. The image forming apparatus as claimed in claim 2, wherein, if the extracted object is an image, the contents processing unit performs at least one process of size conversion, optical character recognition (OCR), color processing of the extracted image, or the combinations thereof.

4. The image forming apparatus as claimed in claim 2, wherein the contents processing unit extracts text by extracting a text data part of the selected job data as text or by performing OCR with respect to an extracted image object.

5. The image forming apparatus as claimed in claim 1, wherein the contents production unit produces e-book contents using a template corresponding to the selected layout.

6. The image forming apparatus as claimed in claim 1, wherein the user interface displays the produced e-book contents.

7. The image forming apparatus as claimed in claim 6, wherein the user interface receives a correcting command with respect to the displayed e-book contents, and the contents production unit corrects the produced e-book contents based on the received correcting command.

8. The image forming apparatus as claimed in claim 1, wherein the function unit performs at least one function of copying, printing, scanning, fax transmitting, fax receiving or the combinations thereof.

9. The image forming apparatus as claimed in claim 1, wherein the storage unit stores the produced e-book contents.

10. The image forming apparatus as claimed in claim 9, wherein the job data includes data that is stored in the storage unit as a result of performing a function by the function unit.

11. The image forming apparatus as claimed in claim 1, wherein the communication interface to receive information of an e-book terminal apparatus.

12. The image formation apparatus as claimed in claim 11, wherein the information comprising:
the one of the plurality of formats of e-book contents, a storing capacity of the e-book terminal apparatus, or the combinations therein.

13. A method for producing electronic book (e-book) contents of an image forming apparatus, the method comprising:
receiving a selection of job data which has been processed by the image forming apparatus during a function performing process;
storing information regarding a plurality of different formats supported by a plurality of electronic book (e-book) terminals;
receiving a selection of a layout for the job data;
producing e-book contents for the selected job data based on the selected layout and in one of the plurality of different formats that is determined to be supported by an e-book terminal to which the produced e-book contents are to be transmitted; and
transmitting the produced e-book contents to the e-book terminal,
wherein the one of the plurality of formats is selected automatically when the e-book terminal is connected to the image forming apparatus.

14. The method as claimed in claim 13, further comprising extracting a plurality of objects from the selected job data,
wherein the producing the e-book contents comprises producing the e-book contents by arranging the extracted objects on the selected layout.

15. The method as claimed in claim 14, wherein, if the extracted objects are an image, the extracting the objects comprises performing at least one process of size conversion, OCR, and color processing of an extracted image (or combination thereof for consistency).

16. The method as claimed in claim 13, further comprising:
transmitting the produced e-book contents to an external device.

17. The method as claimed in claim 13, further comprising:
receiving information of an e-book terminal apparatus.

18. The method as claimed in claim 17, wherein the information comprising:
the one of the plurality of formats of e-book contents, a storing capacity of the e-book terminal apparatus, or the combinations thereof.

19. The method as claimed in claim 14, wherein the extracting the objects comprises extracting text by extracting a text data part of the selected job data as text or by performing OCR with respect to an extracted image object.

20. The method as claimed in claim 13, wherein the producing the e-book contents comprises producing the e-book contents using a template corresponding to the selected layout.

21. The method as claimed in claim 13, further comprising displaying the produced e-book contents.

22. The method as claimed in claim 20, further comprising:
receiving a correcting command with respect to the displayed e-book contents; and
correcting the produced e-book contents based on the received correcting command.

23. The method as claimed in claim 13, wherein the job data includes data that is used in an operation of performing at least one function of copying, printing, scanning, fax transmitting, fax receiving or combinations thereof.

24. The method as claimed in claim 13, further comprising storing the produced e-book contents.

25. The image forming apparatus as claimed in claim 1, wherein one of the plurality of different formats is an electronic publication (EPUB) format.

26. The method as claimed in claim 13, wherein one of the plurality of different formats is an electronic publication (EPUB) format.

* * * * *

UNITED STATES PATENT AND TRADEMARK OFFICE
CERTIFICATE OF CORRECTION

| | | |
|---|---|---|
| PATENT NO. | : 8,970,875 B2 | Page 1 of 1 |
| APPLICATION NO. | : 13/011443 | |
| DATED | : March 3, 2015 | |
| INVENTOR(S) | : Dae-hyun Kim | |

It is certified that error appears in the above-identified patent and that said Letters Patent is hereby corrected as shown below:

Claims

Claim 12, Column 9, Line 13

Delete "formation" and insert --forming--, therefor.

Signed and Sealed this

Thirteenth Day of October, 2015

Michelle K. Lee
*Director of the United States Patent and Trademark Office*